United States Patent
Elangovan et al.

(10) Patent No.: US 10,983,805 B2
(45) Date of Patent: Apr. 20, 2021

(54) CONTEXTUAL KEYBOARD LOCATED ON A REMOTE SERVER FOR IMPLEMENTATION ON ANY CONTENT DELIVERY AND INTERACTION APPLICATION

(71) Applicant: Nod, Inc., Santa Clara, CA (US)

(72) Inventors: Anusankar Elangovan, San Francisco, CA (US); John F. McGowan, III, Mountain View, CA (US); Rahul N. Iyer, San Francisco, CA (US); Jake Kesinger, Bath, ME (US)

(73) Assignee: Nod, Inc., Santa Clara, CA (US)

( * ) Notice: Subject to any disclaimer, the term of this patent is extended or adjusted under 35 U.S.C. 154(b) by 0 days.

(21) Appl. No.: 14/629,363

(22) Filed: Feb. 23, 2015

(65) Prior Publication Data

US 2015/0242087 A1 Aug. 27, 2015

Related U.S. Application Data

(60) Provisional application No. 61/943,291, filed on Feb. 21, 2014.

(51) Int. Cl.
| | |
|---|---|
| *G06F 3/048* | (2013.01) |
| *G06F 9/451* | (2018.01) |
| *G06F 3/0488* | (2013.01) |
| *H04L 29/06* | (2006.01) |

(52) U.S. Cl.
CPC .......... *G06F 9/451* (2018.02); *G06F 3/04886* (2013.01); *H04L 67/38* (2013.01)

(58) Field of Classification Search
CPC .. G06F 3/0233; G06F 3/04886; G06F 3/0237; G06F 9/451; H04L 67/38
USPC .......................................................... 715/733
See application file for complete search history.

(56) References Cited

U.S. PATENT DOCUMENTS

| | | | |
|---|---|---|---|
| 2010/0042946 A1* | 2/2010 | Kodimer | G06F 17/30861 715/773 |
| 2010/0275126 A1* | 10/2010 | Lincke | G06F 3/04886 715/738 |
| 2012/0127082 A1* | 5/2012 | Kushler | G06F 3/04886 345/169 |
| 2013/0117377 A1* | 5/2013 | Miller | H04L 67/38 709/205 |

\* cited by examiner

*Primary Examiner* — Alex Olshannikov
(74) *Attorney, Agent, or Firm* — Pillsbury Winthrop Shaw Pittman LLP

(57) ABSTRACT

Described are apparatus and methods for providing a contextual keyboard service located on a remote server for implementation on any website or device capable of supporting an on-screen keyboard.

10 Claims, 2 Drawing Sheets

CONTEXTUAL KEYBOARD LOCATED ON A REMOTE SERVER FOR IMPLEMENTATION ON ANY CONTENT DELIVERY AND INTERACTION APPLICATION

RELATED APPLICATION

This application is related to and claims priority from U.S. Provisional Application No. 61/943,291 filed on Feb. 21, 2014, entitled "A Contextual Keyboard Located On A Remote Server For Implementation On Any Website," which is expressly incorporated by reference herein.

FIELD OF THE ART

This disclosure relates to a contextual keyboard located on a remote server for implementation on any website or device capable of supporting an on-screen keyboard, such as a smartphone, tablet, TV, laptop, smart eyewear, smart-watch, etc.

BACKGROUND

The typical implementation of a keyboard to enter information on a content delivery and interaction application, such as a website, is either through a physical keyboard or a virtual keyboard that is installed on a device such as a smartphone, tablet, etc.

Historically, users have worked with physical keyboards connected to computers to input information into a content delivery and interaction application. With the advent of touch-based devices such as smartphones and tablets, the physical keyboard has been replaced by a virtual keyboard, with several options available to the user to install and use on their device. Both these foregoing methods are limited in the sense that the contextual element of what is being input on the content delivery and interaction application is limited to non-existent. Furthermore, in the case of certain virtual devices, such as those based on Apple Inc.'s current iOS system, only certain types of interactions with virtual keyboards are allowed, which limit the user experience. For example, tracing a sequence of letters to form a word is not allowed in any current virtual keyboard implementations; users can only enter one character/number/letter at a time.

SUMMARY

Described are apparatus and methods for providing a contextual keyboard service located on a remote server for implementation on any content delivery and interaction application such as a website or device capable of supporting an on-screen keyboard.

DETAILED DESCRIPTION OF THE PREFERRED EMBODIMENTS

Described are methods and apparatus to implement a virtual keyboard, which address conventional limitations, while enhancing the user experience.

By virtual keyboard is meant that on a display screen of a smartphone, tablet, laptop, smart TV or other computer device with a display screen, that when the user opens a content delivery and interaction application, which can be an application (such as virtual reality or augmented reality or other application) or an interface on the device that requires text input or connects to a particular website at a particular website address, that either the application/interface or the website itself is configured with the virtual keyboard as described herein, which allows configuration that is specific to specific features of that particular device or website, and known characteristics of users of such a device or website.

It is understood that the smartphone, tablet, laptop or other computer device includes, in addition to the display screen mentioned, a processor, memory, software that controls the device and allows opening of applications, connection to websites and the like, in a conventional manner. In addition, the computer device allows for the implementation of the capabilities described herein, which include communication with a remote server on which the content delivery and interaction application, such as the accessed website, that contains the functionality herein is hosted.

Figure 1:
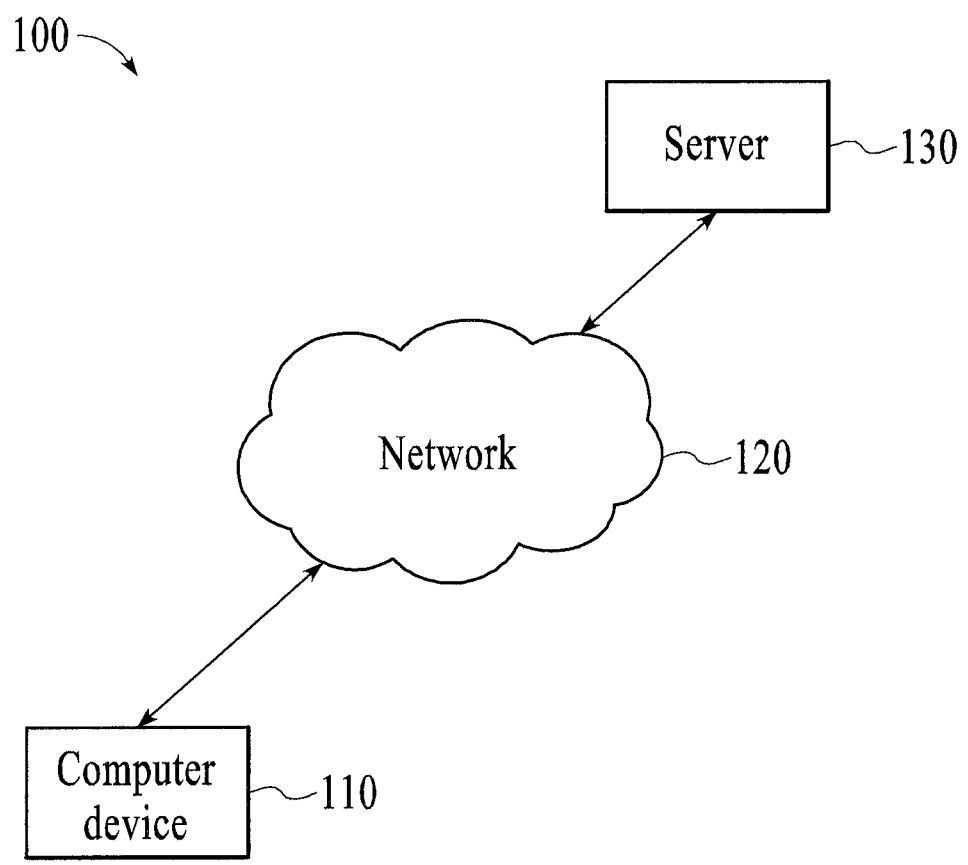
FIG. 1 illustrates an overview of the system according to embodiments described herein.

FIG. 1 illustrates an overview of the system 100, in which a computer device 110 communicates with a server 120 over a network 130, using a communication protocol, such as a TCP/IP protocol.

The methodology for implementing the virtual and contextual keyboard system implemented on a website in the following manner, and it is understood that other content delivery and interaction application can be similarly implemented:

a) An SDK, in particular an image and an API endpoint, written in a special programming language, such as Javascript is provided to the website administrator, or device/application developer as described hereinafter.

b) The website administrator/application developer incorporates this SDK into their code for the website/application, such that when a user selects a search button or a text input field or equivalent on this particular website/application, it results in a visual of the virtual keyboard on the display screen of the computer device of the user.

c) The user can enter text, numbers, special characters, etc., from their computer device by interacting with the virtual keyboard that appears on the display screen, such as in a drop down menu when the user selects a search button or a text input field or equivalent on this particular website. This interaction with the virtual keyboard could be programmed in a number of different ways, such as one keystroke (single mouse click or a touch input on a character on the virtual keyboard) at a time or by drawing a trail through a sequence of keys in a continuous manner. This latter implementation enhances the user experience for those on an iOS device.

d) The SDK stores the coordinates of the inputs relative to the layout of the virtual keyboard and sends this information over the network to the host server, where the contextual keyboard system interprets the coordinates, maps them to actual letters, characters, numbers and/or words and sends the information back over the network to the display screen of the computer device of the user, where it is displayed in real-time.

e) Further, the system also offers suggestions for additional words in the sequence of input text being entered by the user. These suggestions are based on context-awareness and can, if desired, incorporate trending information culled from the world wide web and/or information specific to the website (either provided by the website or obtained from elsewhere) or the application where the virtual keyboard is displayed, which makes for a better user experience.

Figure 2:
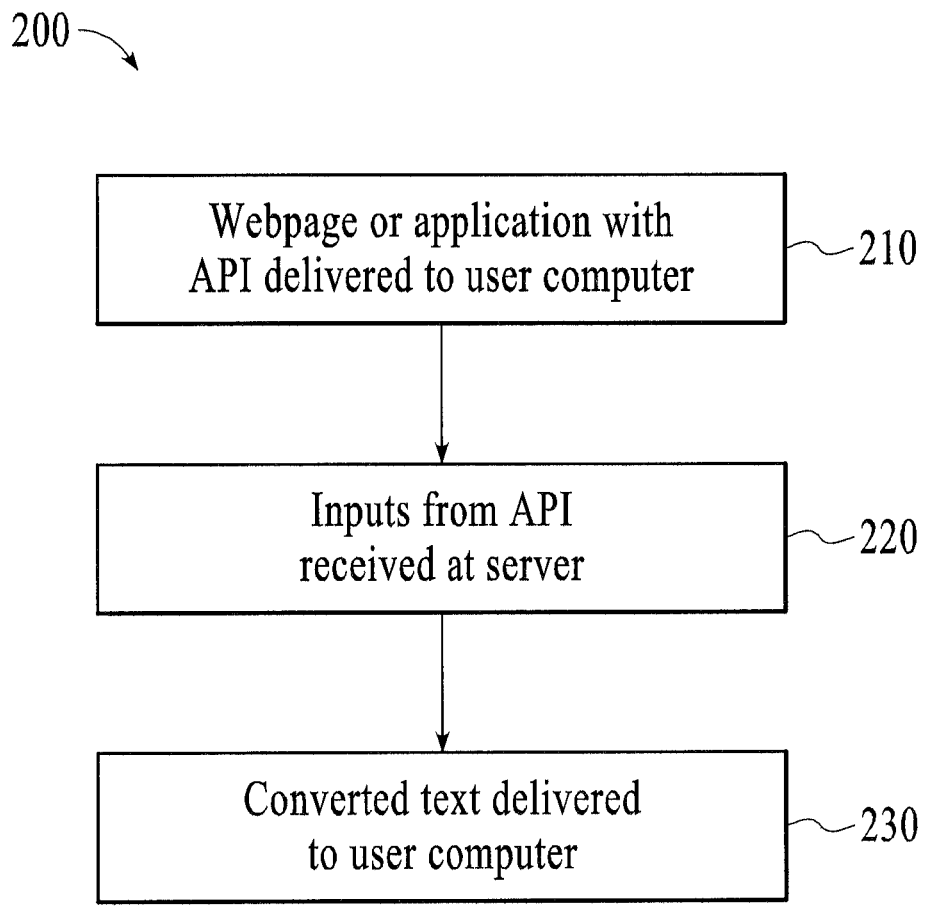
FIG. 2 illustrates a flowchart of the process according to embodiments described herein.

FIG. 2 illustrates a flowchart of the server process 200 that occurs at the server, once the SDK is installed. These initially include step 210 in which the page is delivered to the user in the format corresponding to the computer device and which includes the API. Step 210 is followed by step 220, in which once the user selects a search button or a text input field or equivalent on this particular website and the API is called to deliver to the display screen of the user the virtual keyboard, as well as the functionality to interact with the virtual keyboard caused inputs, the API registered coordinates of the inputs relative to the layout of the virtual keyboard are received at the server from over the network. In step 230, the delivered inputs are operated upon by the website server, which then delivers back to the user computer the actual letters, characters, numbers and/or words.

In a particular aspect, it is apparent that the API can be customized to each different particular website/application, thus allowing, for example, the programming differences to be content based. Thus, for example, a user who virtually selects "bb" on a sports website using the embodiments as described would be provided a baseball sports page link, whereas a user who virtually selects "bb" on a site relating to different types of mobile devices would be provided a link to go to a webpage associated with a Blackberry device. In another use case, a search conducted on a set-top box connected to a TV, would bring up choices for TV shows and movies. In a different use case where the user is searching in a mapping application, the results will correspond to geographical location prediction.

One particular implementation of the SDK is described hereinafter:

Predictions REST API

The Predictions SDK is a REST API that can be used by clients to retrieve word predictions corresponding to a trail on the keyboard. The key elements of using the API are:

The keyboard image
The Rest API call
The Keyboard Image

The Predictions API depends on the coordinates of the trail, hence the dimensions of the keyboard image are important.

The REST API Call

Once the keyboard image has been displayed and the trail recorded (typically through one of the onMouse* events in Javascript), a call can be made to the API endpoint to get the prediction.

The expected call is a HTTP POST request with the arguments listed below.

Arguments

The arguments to the call are:

coords

This is a list of coordinate objects each of which contains two fields: x and y. This could be an Object in javascript, a list of dictionaries in Python or any equivalent structure in other programming languages. This parameter MUST be JSON encoded before it is sent to the server.

For example, the coordinate list [(1, 1), (2, 2), (3, 3)] would be encoded as:

[{"y": 1, "x": 1}, {"y": 2, "x": 2}, {"y": 3, "x": 3}]

cookie

The cookie is an opaque value that is handed to clients by the server. The cookie is the server's way of keeping track of a "typing session". The first request is made without a cookie. The cookie from the response is used for the next request and so on. The response to every call will result in an updated cookie for use with the next call. While passing the cookie hack on each request isn't required, it is recommended since it will increase prediction accuracy.

A typical encoded parameter list looks like:

coords=[{"y": 1, "x": 1}, {"y": 2, "x": 2}, {"y": 3, "x": 3}]&cookie=[ ]

Response

The response is json encoded and consists of two elements predction

This is the prediction of the word corresponding to the trail.

cookie

This is the cookie to be used for the next request.

A typical response looks like:

{"cookie": [5882], "prediction": "cat"}

Code samples

Sending a request

The following function saves the coordinates to a list:

```
var coord_list = new Array( );
function saveCoordinates(x, y) {
    var coords = new Object( )
    coords.x = x;
    coords.y = y;
    coord_list.push(coords);
}
```

The following function sends the list of coordinates to the server for a prediction, decodes the response and logs it:

```
function sendCoordinates( ) {
    xmlhttp = new XMLHttpRequest( );
    xmlhttp.onreadystatechange = function( ) {
    if (xmlhttp.readyState == 4 && xmlhttp.status == 200) {
    var obj = JSON.parse(xmlhttp.responseText);
    console.log(obj.prediction);
    console.log(obj.cookie);
    }
    }
```

Although the present inventions are described with respect to certain preferred embodiments, modifications thereto will be apparent to those skilled in the art.

What is claimed is:

1. A method for operating a plurality of content delivery and interaction applications from a server system that serves a plurality of images corresponding to each content delivery and interaction application and viewable on a display screen of an electronic device of a user, at least some of the images having an application programming interface (API) data structure associated therewith, the data structure including one or more registered coordinate bits and a tracking cookie bit corresponding a tracking cookie for tracking user data and, the at least some of the images also including at least one of a search button and a textual input location requiring input thereto from the user and, each of the content delivery and interaction applications further having associated therewith a one of a plurality of corresponding contextual keyboard software application that includes a one of a plurality of contextual keyboard images and an API endpoint of a contextual keyboard, the method comprising the steps of:

operating a particular content delivery and interaction application containing its corresponding plurality of images from the server system;

upon receipt at the server system of a signal indicative of the user striking either the search button or arriving at the textual input location, invoking the content delivery and interaction application's corresponding contextual keyboard software application at the server system;

transmitting from the server system to the electronic device the contextual keyboard image and functionality to interact with contextual keyboard caused inputs;

receiving at the server system, a call transmitted from the electronic device, the call corresponding to API registered coordinates of the contextual keyboard caused inputs and the tracking cookie data collected at the electronic device;

determining, by the server system, based on the tracking cookie data, a prediction of letters, characters, numbers and/or words corresponding thereto, translating, based on the prediction, at the server system, the registered coordinates into actual letters, characters, numbers and/or words corresponding thereto and transmitting from the server system to the electronic device the actual letters, characters, numbers and/or words corresponding to the registered coordinates, wherein at least one contextual keyboard software application is customized based on content-based programming differences of the API endpoint such that unique results are produced for each API call wherein utilizing a same gesture or command retrieves a different result based on an individual one of the at least one contextual keyboard.

2. The method according to claim 1, wherein the tracking cookie bit is used to keep track of a plurality of actual letters, characters and numbers.

3. The method according to claim 2, wherein the response to each call of registered coordinates of the contextual keyboard caused inputs will result in an updated tracking cookie bit for use with a next call of registered coordinates of the contextual keyboard caused inputs.

4. The method according to claim 1 wherein the content delivery and interaction application is a website.

5. The method according to claim 1 wherein the content delivery and interaction application is a virtual reality application.

6. The method according to claim 1 wherein the content delivery and interaction application is an augmented reality application.

7. The method of claim 1, wherein the functionality to interact with contextual keyboard caused inputs includes programming of one keystroke on the contextual keyboard image at a time.

8. The method of claim 1, wherein the functionality to interact with contextual keyboard caused inputs includes drawing a trail through a sequence of keys on the contextual keyboard image in a continuous manner, wherein the call includes a list of API coordinates corresponding to the trail.

9. The method of claim 1, wherein the contextual keyboard caused inputs are interpreted to predict a result specific to a context of the particular content delivery and interaction application that is being operated.

10. The method of claim 1, wherein the list of coordinates contained in the call is configured as a JSON encoded parameter.

* * * * *